United States Patent
Ho et al.

(10) Patent No.: US 10,666,835 B2
(45) Date of Patent: *May 26, 2020

(54) HIGH-DEFINITION FACSIMILE ROUTING

(71) Applicant: Biscom Inc., Chelmsford, MA (US)

(72) Inventors: S.K. Ho, Carlisle, MA (US); Carlos Mainemer, Nashua, NH (US)

(73) Assignee: Biscom Inc., Chelmsford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/502,222

(22) Filed: Jul. 3, 2019

(65) Prior Publication Data
US 2019/0327388 A1 Oct. 24, 2019

Related U.S. Application Data

(63) Continuation of application No. 15/469,167, filed on Mar. 24, 2017, now Pat. No. 10,348,937.
(Continued)

(51) Int. Cl.
*H04N 1/393* (2006.01)
*H04N 1/60* (2006.01)
(Continued)

(52) U.S. Cl.
CPC ......... *H04N 1/6058* (2013.01); *H04N 1/0022* (2013.01); *H04N 1/32* (2013.01); *H04N 1/3935* (2013.01); *G06F 16/21* (2019.01)

(58) Field of Classification Search
CPC ........ G06F 16/21; H04N 1/0022; H04N 1/32; H04N 1/3935; H04N 1/6058; H04N 1/2187; H04N 1/32432; H04N 2201/0093; H04N 2201/3218; H04N 2201/3295; H04N 1/00228; H04N 1/00244; H04N 1/32101;
(Continued)

(56) References Cited

U.S. PATENT DOCUMENTS 5,805,298 A * 9/1998 Ho .................... H04L 12/5692
   358/402
6,438,274 B1 * 8/2002 Tokuyama ............ G06T 3/4007
   358/1.2
(Continued)

OTHER PUBLICATIONS

International Preliminary Report on Patentability dated Sep. 6, 2019 in PCT international patent application No. PCT/US2018/016831, 11 pages.

*Primary Examiner* — Negussie Worku
(74) *Attorney, Agent, or Firm* — Blueshift IP, LLC; Robert Plotkin

(57) ABSTRACT

A high-definition (HD) fax system routes outbound fax job requests including a high-resolution component to appropriate destinations, including among HD-enabled receiving devices and conventional fax devices. If it is determined that a fax destination is not HD-enabled, such as a conventional fax device, the high-resolution component of the outbound fax job request may be rendered as a low-resolution fax. The low resolution fax may be transmitted via a public switched telephone network (PSTN). On the other hand, if it is determined that a fax destination is HD-enabled, a determination may be made whether the HD-enabled fax destination is color enabled, and the high-resolution component may be rendered as either a high-resolution monochrome fax or a high-resolution color fax.

20 Claims, 7 Drawing Sheets

Related U.S. Application Data

(60) Provisional application No. 62/462,271, filed on Feb. 22, 2017.

(51) Int. Cl.
 H04N 1/32 (2006.01)
 H04N 1/00 (2006.01)
 *G06F 16/21* (2019.01)

(58) Field of Classification Search
 CPC ............... H04N 1/32363; H04N 1/324; H04N 1/32416; H04N 1/4406; H04N 2201/3205; H04N 2201/3208; H04N 2201/3209; H04N 2201/3288
 USPC .................................................. 358/1.15, 1.16
 See application file for complete search history.

(56) References Cited

U.S. PATENT DOCUMENTS

| | | | |
|---|---|---|---|
| 6,477,282 B1* | 11/2002 | Ohtsuki | G06T 3/4007 382/266 |
| 7,155,669 B1* | 12/2006 | Nakagiri | H04N 1/32064 715/209 |
| 7,570,396 B2* | 8/2009 | Murakami | H04N 1/00214 358/402 |
| 8,427,679 B2* | 4/2013 | Fujioka | G06F 3/1207 358/1.11 |
| 8,937,736 B2* | 1/2015 | Rebert | H04N 1/00973 358/1.15 |
| 8,970,865 B2* | 3/2015 | Nakagawa | G06F 3/1205 358/1.1 |
| 8,970,880 B2* | 3/2015 | Riedel | H04N 1/00228 358/1.15 |
| 9,288,361 B2* | 3/2016 | Kamens | H04N 1/2187 |
| 9,813,587 B2* | 11/2017 | Kumagai | H04N 1/393 |
| 10,348,937 B2* | 7/2019 | Ho | H04N 1/6058 |
| 10,381,937 B2* | 8/2019 | Tanaka | H02M 3/33584 |
| 2011/0242587 A1* | 10/2011 | Fukaya | G06F 3/1204 358/1.15 |
| 2018/0241913 A1* | 8/2018 | Ho | H04N 1/32 |
| 2019/0320075 A1* | 10/2019 | Ho | G06F 21/602 |

* cited by examiner

HIGH-DEFINITION FACSIMILE ROUTING

BACKGROUND

Computer fax systems have become widely adopted in business applications due to the ease with which fax documents can be sent and received from different systems and applications without the need for the transmitting or receiving user to perform file conversions, since a common file type (G3 Encoded Fax Image Format) is widely accepted as the file format for communication in the T.30 fax protocol. One problem that exists with fax transmissions, however, is that they have a relatively low resolution. In business workflow applications, which may use optical character recognition (OCR) or bar codes to assist in the automated processing of documents, the low resolution of received fax transmissions may result in a higher level of errors when trying to read and interpret the content of the received documents. Images sent as faxes, such as medical images, may be almost impossible to read on the receiving end, thereby making them unusable for diagnostic purposes.

Although one potential solution to this problem is to transmit faxes at higher resolutions, attempting to transmit such faxes over the public switched telephone network (PSTN) results in unacceptably long delivery times and may incur charges.

What is needed, therefore, are improved methods for transmitting fax transmissions at high resolution that reduce and/or eliminate long delivery times and PSTN charges.

SUMMARY

A high-definition (HD) fax system routes outbound fax job requests including a high-resolution component to appropriate destinations, including among HD-enabled receiving devices and conventional fax devices. If it is determined that a fax destination is not HD-enabled, such as a conventional fax device, the high-resolution component of the outbound fax job request may be rendered as a low-resolution fax. The low resolution fax may be transmitted via a public switched telephone network (PSTN). On the other hand, if it is determined that a fax destination is HD-enabled, a determination may be made whether the HD-enabled fax destination is color enabled, and the high-resolution component of the outbound fax job request may be rendered as either a high-resolution monochrome fax or a high-resolution color fax.

For example, one embodiment of the present invention is directed to a method performed by at least one computer processor of a high-definition (HD) fax system. The method includes receiving an outbound fax job request, the outbound fax job request including a fax destination identifier and a high-resolution component. It is determined whether the fax destination identifier corresponds with an HD-enabled receiving device. If it is determined that the fax destination identifier does not correspond with the HD-enabled receiving device, at least the high-resolution component of the outbound fax job request is rendered as a low-resolution fax, and the low-resolution fax is transmitted via a public switched telephone network (PSTN). If it is determined that the fax destination identifier does correspond with the HD-enabled receiving device, it is determined whether the HD-enabled receiving device is HD color-enabled. If it is determined that the HD-enabled receiving device is not HD color-enabled, then at least the high-resolution component of the outbound fax job request is rendered as a high-resolution monochrome fax. If it is determined that the HD-enabled receiving device is HD color-enabled, then at least the high-resolution component of the outbound fax job request is rendered as a high-resolution color fax.

Other features and advantages of various aspects and embodiments of the present invention will become apparent from the following description and from the claims.

DETAILED DESCRIPTION

Figure 1:
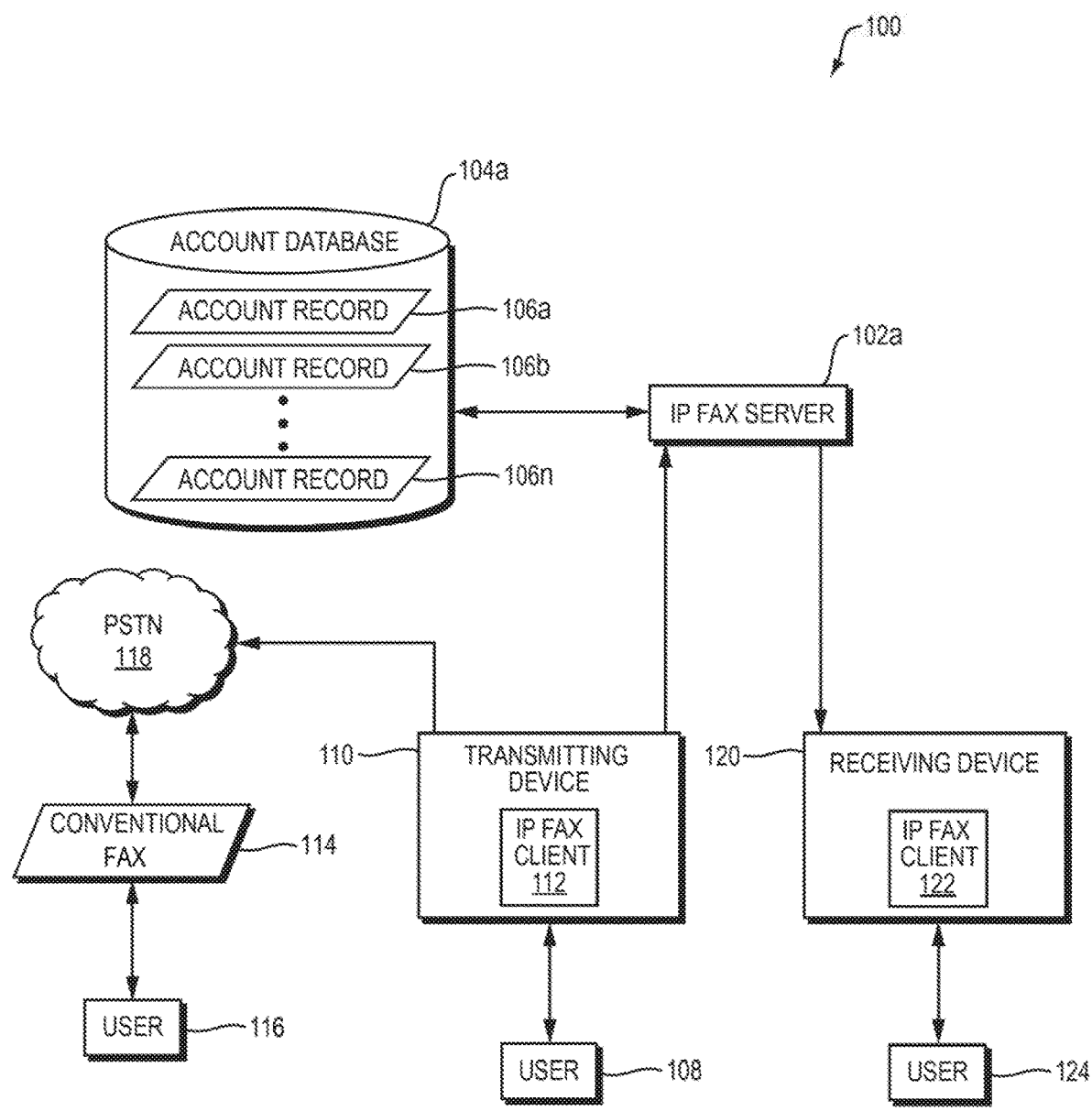
FIG. 1 is a dataflow diagram of a high-definition (HD) fax system for routing high-definition faxes according to one embodiment of the present invention.
Figure 2:
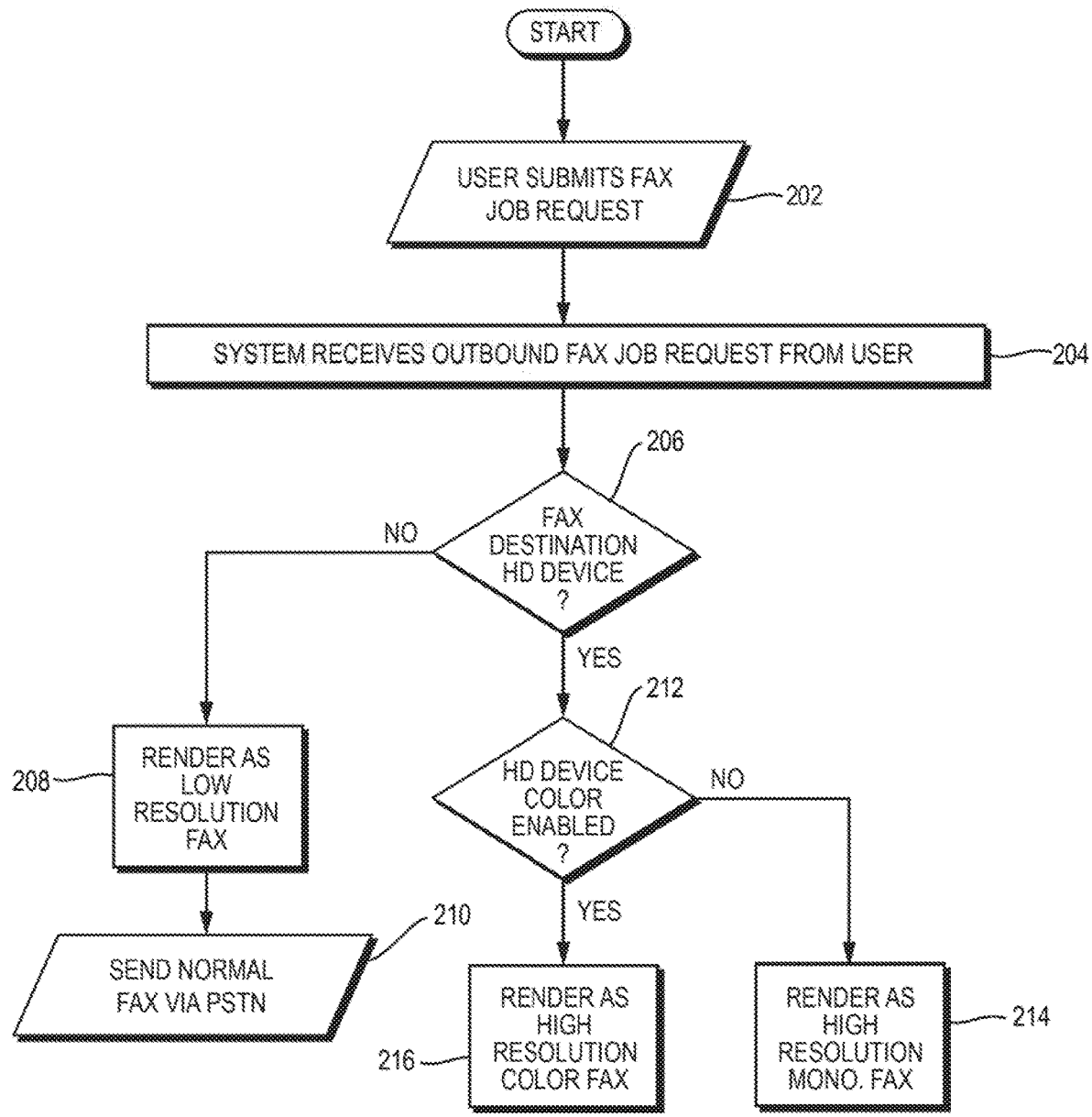
FIG. 2 is a flowchart of a method performed by at least one computer processor of the HD fax system of FIG. 1 according to one embodiment of the present invention.

Referring to FIG. 1, a dataflow diagram is shown of a high-definition (HD) fax system 100 for routing high-definition faxes according to one embodiment of the present invention. Referring to FIG. 2, a flowchart is shown of a method 200 performed by at least one computer processor of the HD fax system 100 of FIG. 1 according to one embodiment of the present invention.

The HD fax system 100 includes an IP fax server 102a, which may perform a variety of functions within the HD fax system 100. For example, the IP fax server 102a may maintain a account database 104a containing data representing a plurality of account records 106a-n, each of which represents a distinct user account. For example, each of the account records 106a-n may represent an account associated with a unique identifier of an account in the HD fax system 100. Representative techniques for associating unique identifiers with other account information are disclosed in Applicant's co-pending U.S. Application Serial No. 2016/0028903, titled "Transmission of Facsimiles via Internet Protocol over Public Networks", which is incorporated herein by reference in its entirety.

Each account may include any of a variety of information, such as any one or more of the following: a conventional fax number, a unique identifier of the account such as an IP address of an HD-enabled transmitting/receiving device corresponding to the account, a mapping between the unique identifier of the account and the conventional fax number, device configuration or setting data, such as color-capability of the HD-enabled transmitting/receiving device, and data identifying a user (e.g., one or more of the user's real name, mailing address, telephone number, email address, and payment (e.g., credit card) information).

Although the account database 104a is described as a "database" herein, more generally the account database 104a may be implemented as any data structure or collection of data structures. Furthermore, although only three particular account records 106a-n are shown in FIG. 1 for ease of illustration, the account database 104a may include any number of account records (i.e., n may be any number). The IP fax server 102a may read data from and write data to the account database 104a using any appropriate mechanism.

The IP fax server 102a may serve any number of users, each of whom may access the IP fax server 102a using any number of client devices, such as an HD-enabled transmitting device 110, a conventional fax device 114, or a HD-enabled receiving device 120. It should be understood that users may be transmitting users and/or receiving users depending on the direction of dataflow, and that the terms "transmitting", "receiving", and the like, are used for ease of illustration.

Further for ease of illustration, a single transmitting user 108, who accesses the IP fax server 102a using a single HD-enabled transmitting device 110, is shown in FIG. 1. A receiving user 116 using a single conventional fax device 114 is shown in FIG. 1. A receiving user 124, who accesses the IP fax server 102a using a single HD-enabled receiving device 120, is shown in FIG. 1.

The HD-enabled transmitting device 110 may be a computing device and may include an IP fax client 112, which may, for example, be a software application that is installed on the HD-enabled transmitting device 110 and which is designed to communicate with the IP fax server 102a via an appropriate protocol. For example, the IP fax server 102a may be in communication with the HD-enabled transmitting device 110 over a packet-switched network, such as the Internet, using a HD Fax over Internet Protocol (FoIP). Alternatively, the IP fax server 102a may be in communication with the HD-enabled transmitting device 110 over a packet-switched network, such as the Internet, using a conventional Fax over Internet Protocol (FoIP). In another exemplary embodiment, HD-enabled transmitting/receiving devices may include one or more browser software applications that a user may use to interface with the IP fax server 102a.

The conventional fax device 114 may be connected to the Public Switched Telephone Network (PSTN) 118, and may be assigned a unique telephone number, referred to herein as a "conventional fax number," within the PSTN. The IP fax server 102a may be in communication with the conventional fax device 114 via the PSTN 118. Accordingly, the term "conventional fax device" refers herein to any device which includes means for transmitting and/or receiving non-IP faxes (e.g., faxes transmitted using the T.30 fax protocol) over the PSTN 118. The term "conventional fax number" refers herein to an identifier that can be used to address a fax over the PSTN.

The HD-enabled receiving device 120 may be a computing device and may include an IP fax client 122, which may be similar or identical to the IP fax client 112 of the HD-enabled transmitting device 110. As users may be transmitters and/or receivers depending on the direction of dataflow, the HD-enabled receiving device 120 may be similar or identical to the HD-enabled transmitting device 110.

The IP fax server 102a may transmit some or all user's account record 106a to IP fax clients 112, 122. The IP fax clients 112, 122 may store some or all of the account record 106a locally. In an alternative peer-to-peer embodiment, all user account data may be stored among the IP fax clients.

In operation, a transmitting user 108 may desire to transmit a fax to receiving users 116 and 124. The transmitting user 108 may submit an outbound fax job request (FIG. 2, operation 202) using the HD-enabled transmitting device 110. The outbound job fax request may include a fax destination identifier and a high-resolution component.

"High-resolution" may include resolutions of 300 dots per inch (DPI) or higher. In one embodiment, high-resolution may include resolutions ranging from 300 DPI to 2400 DPI. Exemplary specific high-resolution measurements include 300 DPI and above, 600 DPI and above, 1200 DPI and above, and 2400 DPI and above. Conversely, "low-resolution" may include resolutions of 200 DPI and below. In one embodiment, low-resolution may include resolutions ranging from 100 DPI to 200 DPI. Exemplary specific low-resolution measurements include 100 DPI and below, 150 DPI and below, and 200 DPI and below.

The IP fax server 102a may receive the outbound fax job request (FIG. 2, operation 204), including the fax destination identifier and the high-resolution component. In one embodiment, the IP fax server 102a may receive the outbound fax job request from the IP fax client 112. In other embodiments, the IP fax server 102a may receive the outbound fax job request via email or auto processing. The IP fax server 102a may receive multiple outbound fax job requests, from multiple sources, including, e.g., the HD-enabled transmitting device 110, and may queue them for processing.

In one embodiment, the high-resolution component of the outbound fax job request may be received as an electronic file attachment associated with an electronic message. For example, the high-resolution component may be received as a Digital Imagining and Communications in Medicine (DICOM) format file. As another example, the high-resolution component may be received as a high-resolution Tagged Image File (TIF) format file. As yet another example, the high-resolution component may be received as a high-resolution Portable Document Format (PDF) file. Other non-limiting examples of high-resolution components may include file types from the Microsoft Office suite of applications, such as Microsoft Word document files, Microsoft Excel document files, Microsoft Publisher files, and Microsoft Visio files. The IP fax server 102a may contain logic to determine that the electronic file attachment is of a high-resolution format, e.g., a DICOM format file, a TIF format file, or a PDF file. In an alternative embodiment, the high-resolution component may be received via a direct file transfer.

During processing of the outbound fax job request, the fax destination identifier may be reviewed to determine whether the fax destination identifier corresponds with an HD-enabled receiving device (FIG. 2, operation 206), such as HD-enabled receiving device 120.

In one exemplary embodiment, the IP fax server 102a may determine whether the fax destination identifier is a unique identifier of an account in the HD fax system 100. For example, fax destination identifiers may be conventional fax numbers. For accounts existing in the HD fax system 100, those conventional fax numbers may be mapped to unique identifiers of the accounts. If the fax destination identifier matches a unique identifier of an account in the HD fax system 100, it may be determined that the fax destination identifier corresponds with an HD-enabled receiving device. If the fax destination identifier does not match a unique identifier of an account in the HD fax system 100, it may be determined that the fax destination identifier does not correspond with an HD-enabled receiving device.

Alternatively, the IP fax server 102*a* may compare the fax destination identifier against a lookup table comprising a plurality of fax destination identifiers associated with the HD fax system 100. For example, the lookup table may be a part of the account database 104*a* of the IP fax server 102*a*. In another exemplary embodiment, the IP fax server 102*a* may review configuration data corresponding to the fax destination identifier to determine whether the fax destination identifier corresponds with an HD-enabled receiving device. For example, the configuration data may be stored in the account records 106*a-n* of the account database 104*a*.

As with any of the other operations disclosed herein, equivalent results may be achievable using alternative logic. For example, the fax destination identifier could be compared against a lookup table comprising a plurality of fax destination identifiers known not to match a unique identifier of an account in the HD fax system 100. Such alternatives are considered to be within the scope of the present application.

If it is determined during operation 206 that the fax destination identifier does not correspond with a HD-enabled receiving device, the high-resolution component of the outbound job fax request may be rendered by the IP fax server 102*a* as a low-resolution fax (FIG. 2, operation 208). The low-resolution fax may be transmitted to the conventional fax device 114 via the PSTN 118 (FIG. 2, operation 210). Alternatively, the transmitting device 110 may render the high-resolution component of the outbound fax job request as a low-resolution fax, and the low-resolution fax may be transmitted via the PSTN from the transmitting device 110 to the conventional fax device 114.

If it is determined during operation 206 that the fax destination identifier does correspond with a HD-enabled receiving device, such as HD-enabled receiving device 120, a determination may be made whether the HD-enabled receiving device 120 is color-enabled (FIG. 2, operation 212).

In one exemplary embodiment, the IP fax server 102*a* may compare the fax destination identifier against a lookup table comprising a plurality of fax destination identifiers corresponding to HD-devices that are color-enabled. For example, the lookup table may be a part of the account database 104*a* of the IP fax server 102*a*.

Alternatively, the IP fax server 102*a* may review configuration data associated with the fax destination identifier. For example, configuration data indicating color capability and a resolution associated with the fax destination identifier may be stored in the account database 104*a*. In another exemplary embodiment, the IP fax server 102*a* may review configuration settings associated with the HD-enabled receiving device 120. For example, configuration settings may be stored in the account database 104*a*, or retrieved from another source, such as a manufacturer server of the HD-enabled receiving device 120.

If it is determined during operation 212 that the HD-enabled receiving device 120 is not color-enabled, the high-resolution component of the outbound fax job request may be rendered by the IP fax server 102*a* as a high-resolution monochrome fax (FIG. 2, operation 214). It is possible that an outbound fax job request may contain a low-resolution component in addition to the high-resolution component. In such a scenario, it is possible that the low-resolution component may be rendered as part of the high-resolution monochrome fax, or alternatively as a separate fax.

In one embodiment, the high-resolution component of the outbound fax job request may be rendered in an electronic file format. For example, the high-resolution component may be rendered as a Tagged Image File (TIF) format file, or a Portable Document Format (PDF) file. As another example, the high-resolution component may be rendered as a Digital Imagining and Communications in Medicine (DI-COM) format file. In one embodiment, the high-resolution component may be rendered in multiple electronic files. For example, the high-resolution component may be split into a number of multiple electronic files that corresponds to a number of printable pages (i.e., one file per page). As another example, the high-resolution component may be split so that no one electronic file is larger than a predetermined maximum file size.

The high-resolution monochrome fax may be transmitted from the IP fax server 102*a* to the HD-enabled receiving device 120. In one embodiment, the high-resolution monochrome fax is transmitted to the HD-enabled receiving device via a packet-switched network. One of ordinary skill in the art will appreciate that the high-resolution monochrome fax is not transmitted over the PSTN. Accordingly, low resolution limits may be avoided. Further, slow transfer speeds over the PSTN and PSTN related charges may be avoided.

If it is determined during operation 212 that the HD-enabled receiving device 120 is color-enabled, the high-resolution component of the outbound fax job request may be rendered by the IP fax server 102*a* as a high-resolution color fax (FIG. 2, operation 216). If the outbound fax job request contains a low-resolution component, the low-resolution component may be rendered as part of the high-resolution fax, or alternatively as a separate fax.

In one embodiment, the high-resolution component of the outbound fax job request may be rendered in an electronic file format, such as a TIF file or a PDF file. In one embodiment, the high-resolution component may be rendered in multiple electronic files (e.g., may be split to correspond to page number or to not exceed a maximum file size).

The high-resolution color fax may be transmitted from the IP fax server 102*a* to the HD-enabled receiving device 120. The high-resolution color fax may be transmitted to the HD-enabled receiving device over a packet-switched network. The high-resolution color fax may not be transmitted over the PSTN thereby avoiding low resolution limits, slow transfer speeds, and charges.

Figure 3:
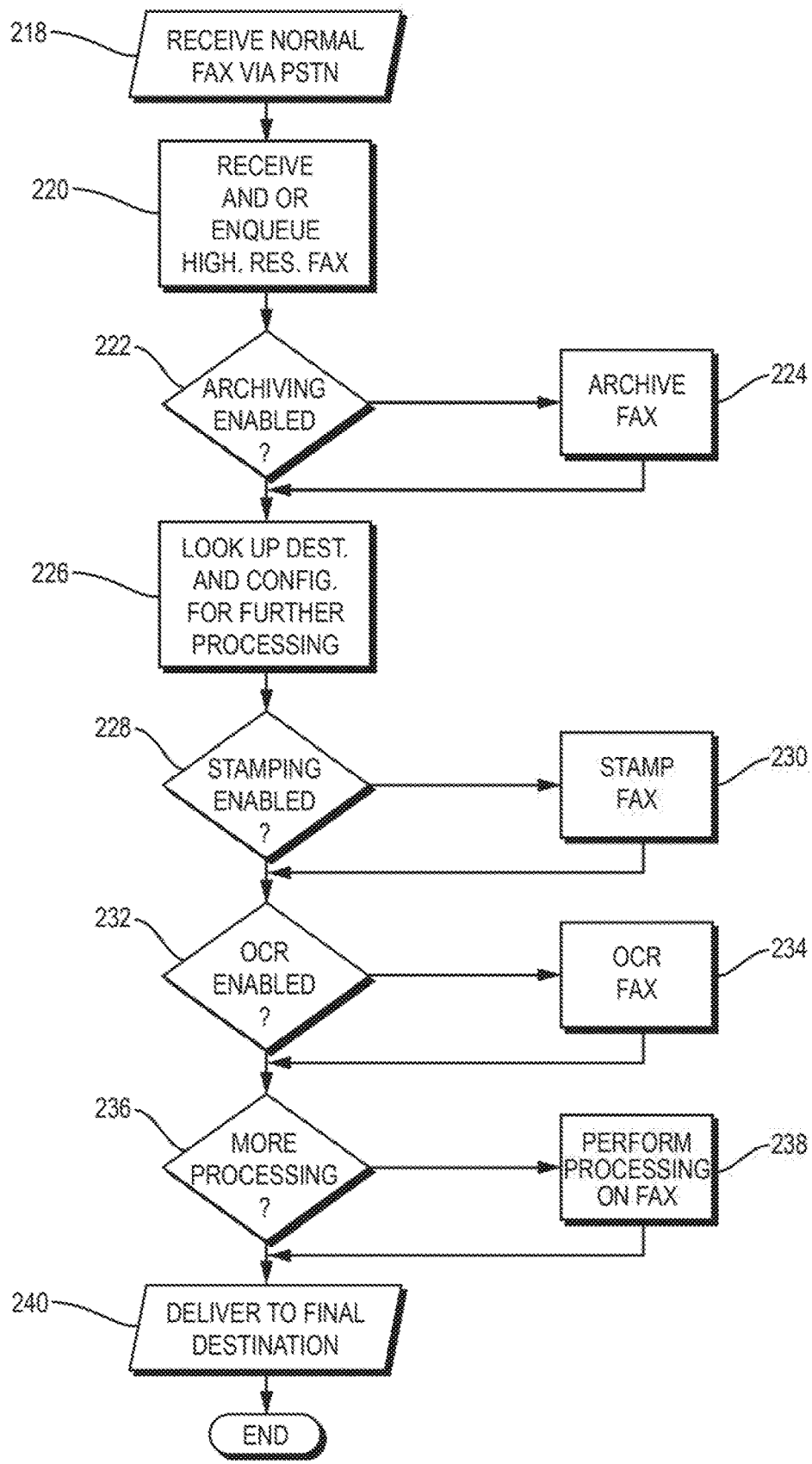
FIG. 3 is a flowchart of a method performed by at least one computer processor of the HD fax system of FIG. 1 according to one embodiment of the present invention.

Once received, optional post processing may be performed on the received fax. FIG. 3 is a flowchart of a method performed by at least one computer processor of the HD fax system 100 of FIG. 1 according to one embodiment of the present invention.

User 116 may receive the low resolution fax from the transmitting device 110 via the conventional fax device 114 (FIG. 3, operation 218). The received low resolution fax may be uploaded into a client application for optional post processing.

User 124 may receive the high-resolution color or monochrome fax (FIG. 3, operation 220). In one embodiment, the received high-resolution color or monochrome fax may be received directly into the IP fax client 122 of the HD-enabled receiving device 120, and may undergo optional post processing. For example, in operation 222, the IP fax client 122 may determine whether archiving is enabled. If archiving is enabled, the received fax may be archived (FIG. 3, operation 224). In one embodiment, archiving may be performed at the IP fax server 102*a*. In an alternative embodiment, archiving may be performed at the IP fax client 122.

In operation 226, the destination (e.g., the fax destination identifier) may be used to determine receiver configuration information for further optional post processing. For example, in operation 228, the IP fax client 122 may determine whether stamping is enabled. If stamping is enabled, the received fax may be stamped (FIG. 3, operation 230). In operation 232, the IP fax client 122 may determine whether optical character recognition (OCR) is enabled. If OCR is enabled, the received fax may be subjected to OCR (FIG. 3, operation 234). In operation 236, the IP fax client 122 may determine whether additional processing is desired. If additional processing is desired, the received fax may be subjected to additional processing (FIG. 3, operation 238). After optional post processing is complete, the received fax may be delivered to its ultimate destination (e.g., a fax mailbox, email, a UNC, a printer, a file-transfer-protocol (FTP) destination, a secure file transfer (SFT) protocol) (operation 240).

Some or all of the HD fax system 100 of FIG. 1 may be located within a local network, such as a corporate intranet. For example, the IP fax server 102*a*, the HD-enabled transmitting device 110, the HD-enabled receiving device 120, and HD-enabled transmitting/receiving devices (not shown) of other users who access the IP fax server 102*a* may all be addressable at IP addresses within a particular local network. As a result, only users 108, 124 and other users having HD-enabled transmitting/receiving devices within the local network of the IP fax server 102*a* may be able to communicate with the IP fax server 102*a* and, as a result, only such users may be able to transmit high-resolution faxes within the local network because account records 106*a-n* may be only accessible via the IP fax server 102*a* and the account database 104*a* that it maintains. In other words, in such an embodiment, users having HD-enabled transmitting/receiving devices located outside the local network of the IP fax server 102*a* may be unable to use the IP fax server 102*a* to transmit/receive high-resolution faxes. More specifically, users of two different database instances (such as account database instances 104*a* and 104*b* in FIG. 4) may be unable to transmit/receive high-resolution faxes to each other using the current state of the art.

Embodiments of the present invention may address this problem in a variety of ways to enable any user having a HD-enabled transmitting/receiving device connected to the public Internet to transmit/receive high resolution monochrome or color faxes. For example, referring to FIG. 4, a dataflow diagram is shown of a system 300 for enabling users connected to the public Internet, but not to the local network of the IP fax server 102*a*, to use the IP fax server 102*a* to transmit/receive high resolution monochrome or color faxes to user 124, and to other users of the IP fax server 102*a* (i.e., other users having account records in the account database 104*a* of the IP fax server 102*a*). Referring to FIG. 5, a flowchart is shown of a method 400 performed by the system 300 according to one embodiment of the present invention.

Figure 4:
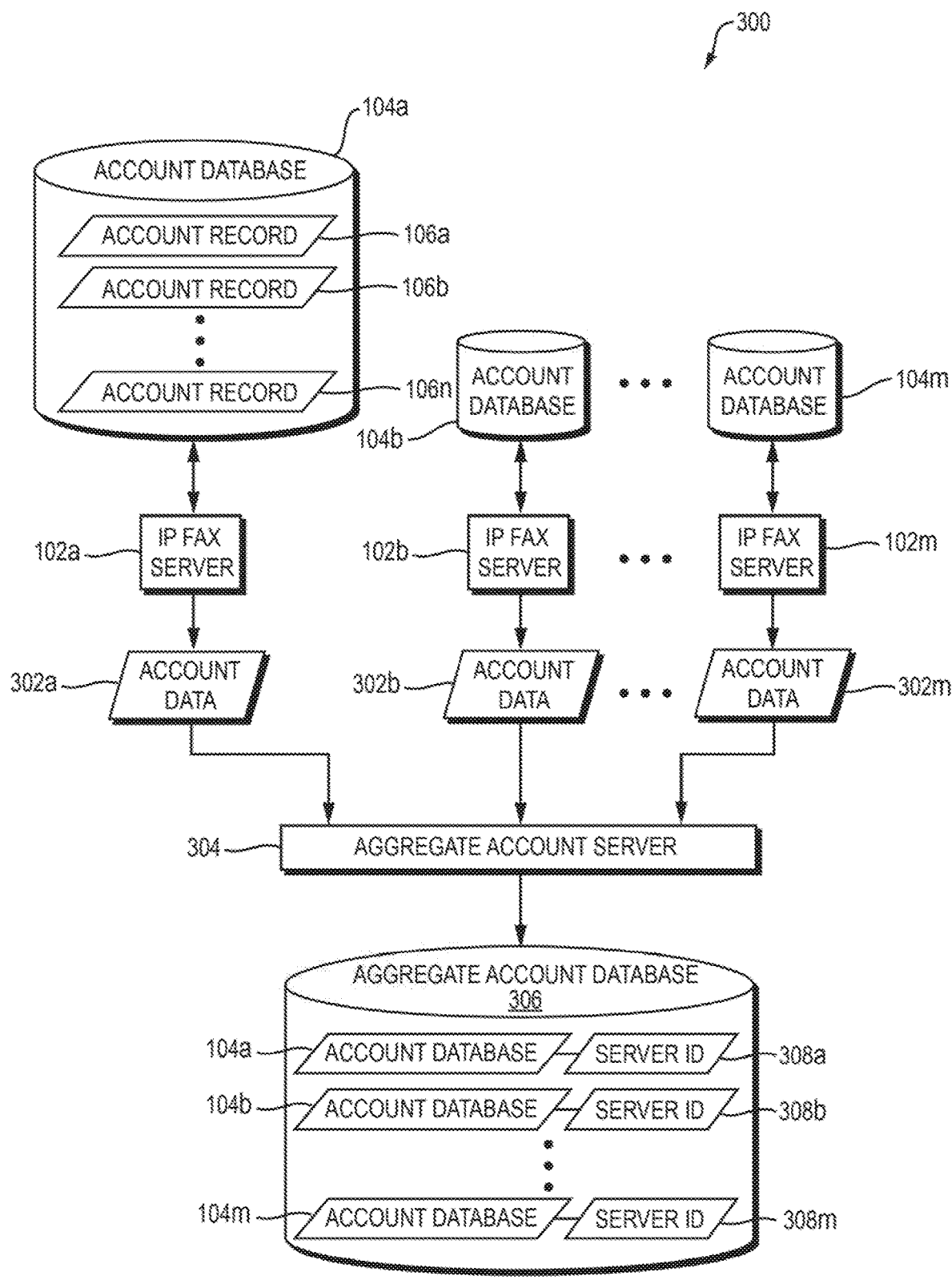
FIG. 4 is a dataflow diagram of for enabling user account data from multiple IP fax servers to be accessed via a single server according to one embodiment of the present invention.
Figure 5:
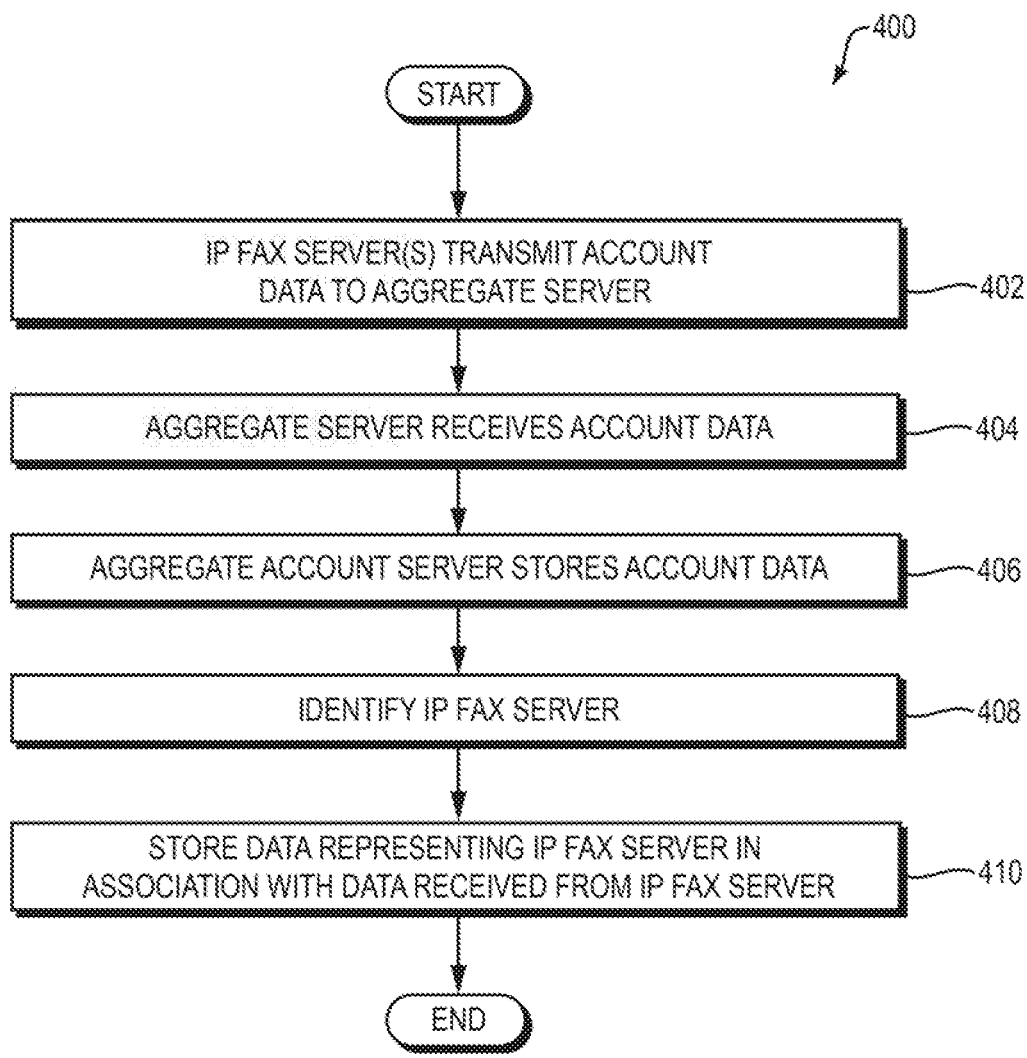
FIG. 5 is a flowchart of a method performed by the system of FIG. 4, according to one embodiment of the present invention.

The system 300 of FIG. 4 includes the IP fax server 102*a* and account database 104*a* of FIG. 1. The system 300 may also include any number of additional IP fax servers 102*b-m* and associated account databases 104*b-m*. Each such IP fax server and associated account database may operate in any of the ways disclosed herein for the IP fax server 102*a* and associated account database 104*a*. In particular, each such IP fax server and associated account database may operate within its own local network. For example, the IP fax server 102*a* and associated account database 104*a* may be addressable within a first local network, IP fax server 102*b* and associated account database 104*b* may be addressable within a second local network, and IP fax server 102*m* and associated account database 104*m* may be addressable with an mth local network.

The system 300 may include an aggregate account server 304. In general, the aggregate account server 304 may make account data (e.g., unique identifiers) from one or more of the IP fax servers 102*a-m* accessible over the public Internet, so that users connected to the public Internet may transmit high resolution faxes to users of one or more of the IP fax servers 102*a-m*, even if the transmitting user does not have access to the local network of the receiving user (e.g., even if the HD-enabled transmitting device of the transmitting user is not addressable within the same local network as the HD-enabled receiving device of the receiving user). For example, the aggregate account server 304 may make it possible for a transmitting user to transmit a high-resolution fax to a receiving user who is behind a firewall of a local network.

In particular, each of one or more of the IP fax servers 102*a-m* may transmit some or all of its associated account data 302*a-m* to aggregate account server 304 (FIG. 5, operation 402). The aggregate account server 304 may receive such account data (FIG. 5, operation 404). The aggregate account server 304 may store the received account data in an aggregate account database 306 (FIG. 5, operation 406). For example, FIG. 4 illustrates an example in which the entirety of account databases 104*a*, 104*b*, and 104*m* have been received and stored by the aggregate account server 304 in the aggregate account database 306.

When the aggregate account server 304 receives account data from one of the IP fax servers 102*a-m*, the aggregate account server 304 may identify the IP fax server that transmitted the account data (FIG. 5, operation 408). The aggregate account server 304 may store data representing the identity of the transmitting IP fax server in association with the account data received from that IP fax server (FIG. 5, operation 410). For example, FIG. 4 illustrates an example in which the aggregate account database 306 includes server identification data 308*a* identifying transmitting IP fax server 102*a*, server identification data 308*b* identifying transmitting IP fax server 102*b*, and server identification data 308*m* identifying transmitting IP fax server 102*m*.

The aggregate account server 304 need not store copies of data from the account databases 104*a-m*. Alternatively, for example, when the aggregate account server 304 receives a request to transmit a high resolution monochrome or color fax to a user of one of the IP fax servers 102*a-m*, the aggregate account server 304, in response to such a request, may obtain data from one or more of the IP fax servers 102*a-m* as necessary to direct the high resolution monochrome or color fax to the appropriate one of the IP fax servers 102*a-m*. The aggregate account server 304 may, in other words, receive account data or other data from the IP fax servers 102*a-m* on demand, instead of or in addition to storing copies of such data in the aggregate account database 306. For ease of illustration and explanation, however, the description below will reference the embodiment of FIG. 4, in which copies of the account databases 104*a-m* are stored in the aggregate account database 306.

The aggregate account server 304 and/or the aggregate account database 306 may be addressable over the public Internet. For example, the aggregate account server 304 may be accessible at a public IP address that is published and advertised in association with the aggregate account server 304. As a result, users having HD-enabled transmitting/receiving devices that are connected to the public Internet may use such HD-enabled transmitting/receiving devices to communicate with the aggregate account server 304 and/or the aggregate account database 306.

Figure 6:
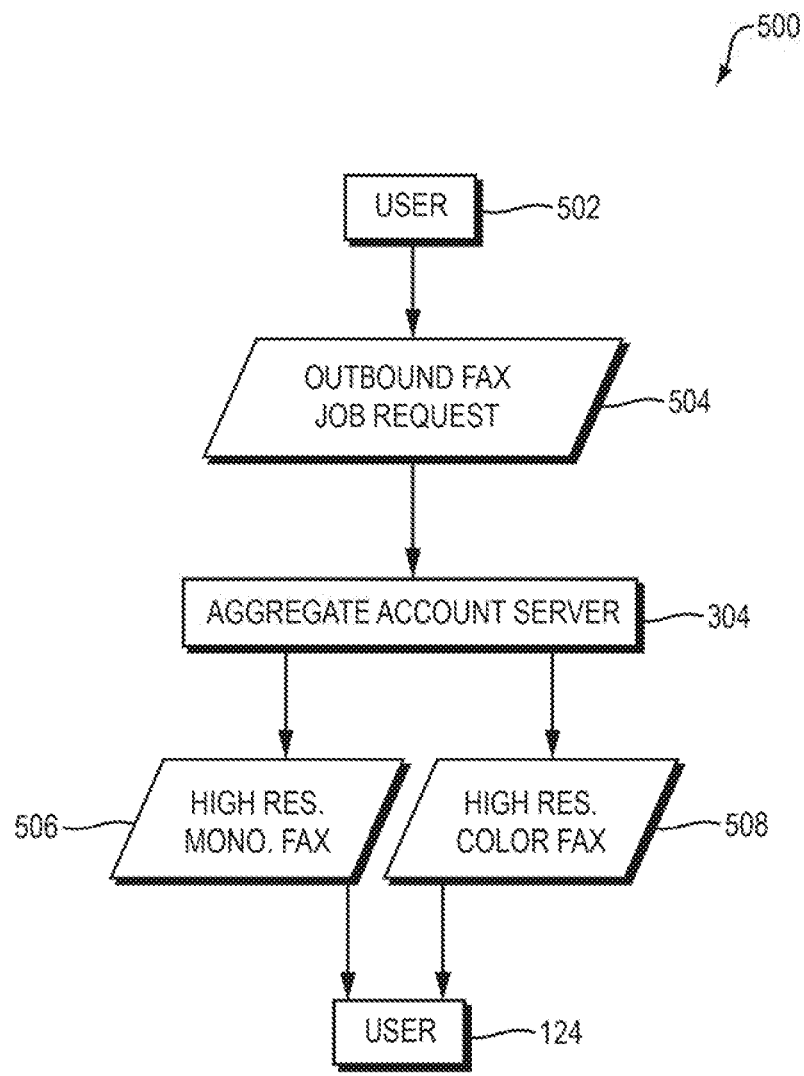
FIG. 6 is a dataflow diagram of a HD fax system for enabling users having HD-enabled transmitting/receiving devices to transmit IP faxes to other users according to one embodiment of the present invention.
Figure 7:
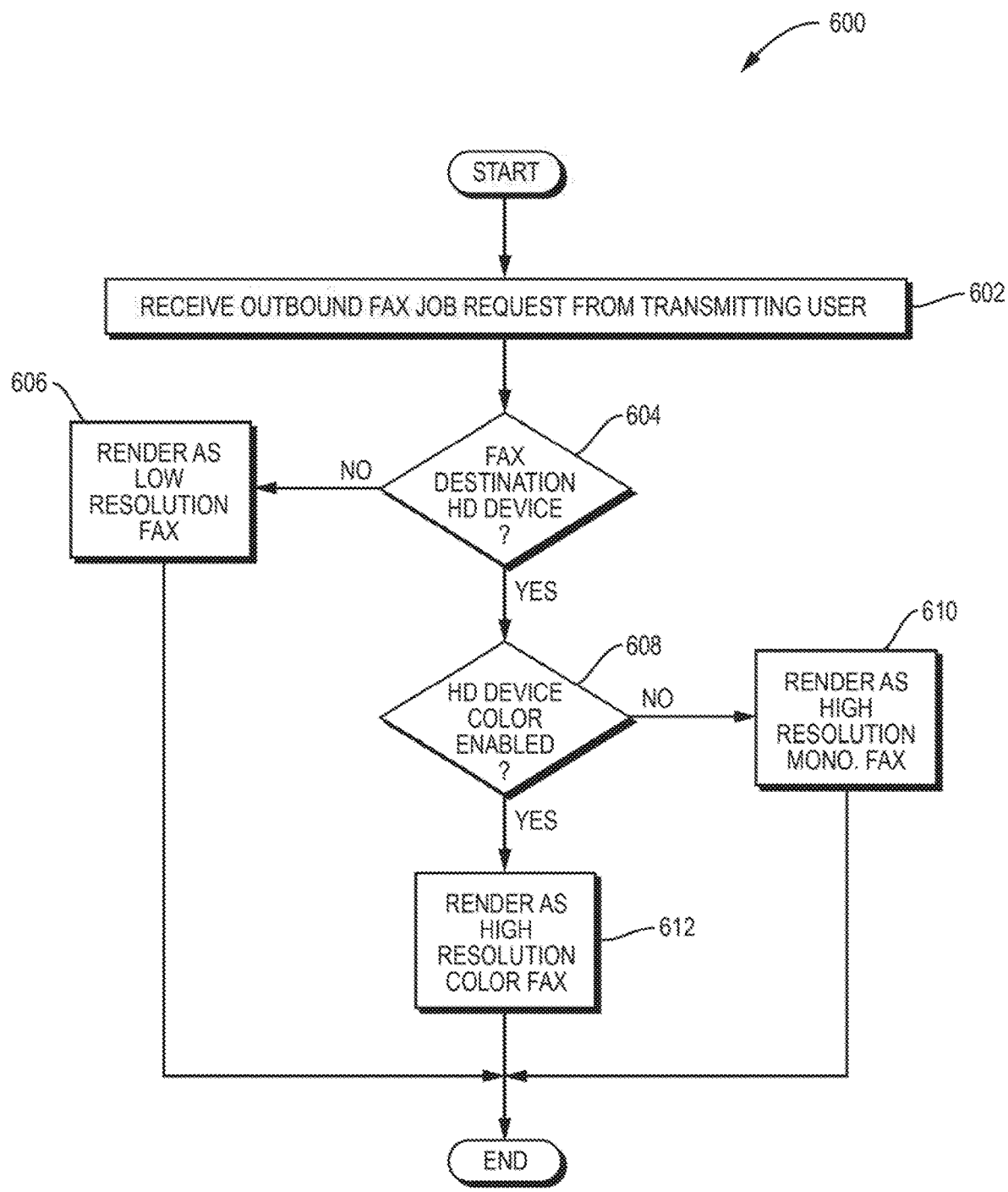
FIG. 7 is a flowchart of a method performed by the HD fax system of FIG. 6 according to one embodiment of the present invention.

In particular, referring to FIG. 6, a dataflow diagram is shown of a HD fax system 500 for using the aggregate account server 304 to enable users having HD-enabled transmitting/receiving devices connected to the public Internet to use those HD-enabled transmitting/receiving devices to transmit IP faxes, and other kinds of messages, to users of one or more of the IP fax servers 102*a-m* according to one embodiment of the present invention. Referring to FIG. 7, a flowchart is shown of a method 600 performed by the HD fax system 500 of FIG. 5 according to one embodiment of the present invention.

In the following discussion, the user who transmits a fax is referred to as the "transmitting user" and the user who receives the fax is referred to as the "receiving user." Referring to FIG. 6, a transmitting user 502 may transmit, to the aggregate account server 304, an outbound fax job request 504 to transmit a fax to a receiving user. Assume for purposes of example that the receiving user is receiving user 124 of FIG. 1. The aggregate account server 304 receives the outbound fax job request (FIG. 6, operation 602).

An outbound fax job request 504 may include any electronic data. For example, an outbound fax job request may include any one or more of the following:
- a high resolution component such as one or more files specified by the transmitting user 502, having any file type or combination of file types (such as a Digital Imaging and Communications in Medicine (DICOM) format file, a Tagged Image File (TIF) format file, or a Portable Document Format (PDF) file);
- data derived from files specified by the transmitting user 502, such as compressed versions of files specified by the transmitting user 502 and/or data resulting from converting files specified by the transmitting user 502 into a different data format;
- data identifying the transmitting user 502 (such as one or more of a conventional fax number, a unique identifier of an account such as an IP address of an HD-enabled transmitting device, or email address associated with the transmitting user 502);
- data identifying the receiving user 124 (such as one or more of a conventional fax number, a unique identifier of an account such as an IP address of an HD-enabled receiving device, or email address associated with the receiving user 124); and
- metadata, such as header data, which may include, for example, data representing a transmission time, a transmission method, and a data format.

The transmitting user 502 may generate the outbound fax job request 504 in any of a variety of ways. For example, the transmitting user 502 may generate the outbound fax job request 504 by:
- using an IP fax client installed on the transmitting user 502's computing device to generate the outbound fax job request 504 to transmit a document, such as a HD image file, to a conventional fax number of the receiving user 124;
- transmitting an email message containing one or more attachments to a predetermined email address associated with the aggregate account server 304 and specifying a fax destination identifier of the receiving user 124;
- using a locally-installed or web-based secure document delivery application to generate the outbound fax job request 504; or
- scanning a paper document using a scanner that is connected to the transmitting user 502's computing device, and using that computing device to generate the outbound fax job request 504.

As mentioned above, the aggregate account server 304 may have an IP address that is accessible via the public Internet. The transmitting user 502 may transmit the outbound fax job request 504 to the aggregate account server 304 by addressing the aggregate account server 304 at such a publicly-accessible IP address. The transmitting user 502 may obtain such an IP address in any of a variety of ways, such as by searching for it via a search engine, or by transmitting the outbound fax job request 504 to the aggregate account server 304 using client software (such as an IP fax client) that may have the public IP address of the aggregate account server 304 embedded in it.

As mentioned above, the outbound fax job request 504 may include any of a variety of data. For example, the outbound fax job request 504 may include data to include in a fax transmission to the receiving user 124, such as one or more files containing any combination of text and images (e.g., black-and-white and/or color images) in any format (e.g., a DICOM image file, a TIF file, or a PDF file), and a fax destination identifier.

During processing of the outbound fax job request 504, the fax destination identifier may be reviewed to determine whether the fax destination identifier corresponds with an HD-enabled receiving device, such as HD-enabled receiving device 120 (FIG. 6, operation 604). In one exemplary embodiment, the fax destination identifier may be a conventional fax number of the receiving user 124. In another exemplary embodiment, the fax destination identifier may be a unique identifier of an account in the HD fax system 500, such as an IP address of an HD-enabled transmitting/receiving device corresponding to the account. Assuming the fax destination identifier is of the receiving user 124, the outbound fax job request 504 may, for example, include some or all of the data in the account record (e.g., 106*a*) of the receiving user 124. For example, the outbound fax job request 504 may include the conventional fax number of the receiving user 124, said conventional fax number being stored in the account record 106*a* of the receiving user 124. As another example, the outbound fax job request 504 may include the IP address of an HD-enabled transmitting/receiving device, said IP address being stored in the account record 106*a* of the receiving user 124.

In an embodiment where the fax destination identifier is the conventional fax number of the receiving user 124, an IP fax number of the receiving user 124 may be obtained in a variety of ways, if one exists (i.e., if the receiving user is associated with an HD-enabled transmitting/receiving device). For example, the aggregate account server 304 may receive identifying information (e.g., the conventional fax number) of the receiving user 124. In response, the aggregate account server 304 may use the identifying information as a query to search the aggregate account database 306 and thereby obtain the receiving user 124's IP fax number as a result of the search. In one embodiment, the aggregate account server 304 may then transmit the IP fax number of the receiving user 124 to the transmitting user 502, who may then include the IP fax number of the receiving user 124 in the outbound fax job request 504 and in any subsequent requests to transmit faxes to the receiving user 124. In another embodiment, the IP fax number of the receiving user 124 may be used by aggregate account server 304 to render and/or deliver a high-resolution monochrome or color fax.

If the fax destination identifier does not correspond with a HD-enabled receiving device (e.g., does not include any data in the account records 106*a-n*, or if the fax destination identifier includes data in the account records 106*a-n* associated with a non-HD receiving device such as the conventional fax device 114), the HD fax system 500 may render the high-resolution component of the outbound fax job request 504 as a low-resolution fax (FIG. 6, operation 606). In one embodiment, the low-resolution fax may be transmitted from the HD fax system 500 to the non-HD receiving device via the PSTN.

If the fax destination identifier does correspond with a HD-enabled receiving device, the aggregate account server 304 may determine whether the HD-enabled receiving device 120 is color-enabled (FIG. 6, operation 608). The aggregate account server 304 may determine whether the HD-enabled receiving device 120 is color-enabled in any of a variety of ways. For example, the aggregate account server 304 may compare the fax destination identifier against a lookup table comprising a plurality of fax destination identifiers corresponding to HD-devices that are color-enabled. For example, the lookup table may be a part of the aggregate account database 306.

As another example, the aggregate account server 304 may review configuration data associated with the fax destination identifier. In one embodiment, the aggregate account server 304 may identify the receiving user 124's account record 106*a* in the account database 104*a* in the aggregate account database 306 and determine that the HD-enabled receiving device 120 is color-enabled based on data in that account record. For example, the receiving user 124's account record 106*a* may contain an indication that the receiving user 124's HD-enabled receiving device 120 is color-enabled. In another exemplary embodiment, the aggregate account server 304 may review configuration settings associated with the HD-enabled receiving device 120. For example, configuration settings may be stored in the aggregate account database 306, or retrieved from another source, such as a manufacturer server of the HD-enabled receiving device 120.

As yet another example, the outbound fax job request 504 received from the transmitting user 502 may indicate whether the HD-enabled receiving device 120 is color enabled. Note, however, that the outbound fax job request 504 need not specify whether the HD-enabled receiving device 120 is color enabled. In fact, one benefit of certain embodiments of the present invention is that they do not require the transmitting user 502 to specify whether the HD-enabled receiving device is color enabled, but instead the system 300 may identify such without input from the transmitting user 502.

If it is determined that the HD-enabled receiving device 120 is not color enabled, the HD fax system 500 may render the high-resolution component of the outbound fax job request as a high-resolution monochrome fax 506 (FIG. 6, operation 610). The high-resolution monochrome fax 506 may be communicated to the user 124 of the HD-enabled receiving device 120.

If it is determined that the HD-enabled receiving device 120 is color enabled, the HD fax system 500 may render the high-resolution component of the outbound fax job request as a high-resolution color fax (FIG. 6, operation 612). The high-resolution color fax 508 may be communicated to the user 124 of the HD-enabled receiving device 120.

Embodiments of the present invention have a variety of advantages, such as the following. One advantage of embodiments of the present invention is that they enable anyone having access to a computing device that is connected to the public Internet to transmit high-quality faxes (such as high-definition color faxes using Biscom's HD-IP Fax technology) to other users, even if such other users receive such faxes using fax clients that are behind a firewall in a private network, such as a corporate LAN. By using a publicly-accessible server in conjunction with a public registry of IP fax numbers, embodiments of the present invention increase the reach of IP fax to extend to the entire public Internet.

One benefit of enabling any user to transmit IP faxes to other users is that IP faxes can be transmitted at much higher speeds than conventional faxes, because IP faxes can be transmitted over any IP network medium, not merely over PSTN telephone lines. In particular, either the transmitting user 502's outbound fax job request 504, the resulting high-resolution monochrome or color fax 506, 508, or both the request and the fax may be transmitted via IP. In cases in which both the outbound fax job request 504 and the resulting high-resolution monochrome or color fax 506, 508 are transmitted via IP, the entire transmission (consisting of both the outbound fax job request 504 and the resulting high-resolution monochrome or color fax 506, 508) may be transmitted via IP, thereby enabling the entire transmission to benefit from the increased speed of IP transmission.

Another advantage of embodiments of the present invention is that, by using the IP fax server, including Biscom's HD-IPFax server, they enable faxes to be transmitted in color and/or at higher resolutions than conventional faxes. For example, Biscom's HD-IPFax server has no theoretical maximum resolution and may, for example, be used to transmit IP faxes at resolutions of 300 dots per inch (dpi), 600 dpi, 1200 dpi, 2400 dpi, and higher. As a result, embodiments of the present invention may enable faxes to be transmitted in ways that are useful for transmitting medical images and other documents that require color and/or high resolution. In practice, users may select a resolution that provides an acceptable tradeoff between image quality, transmission speed, and storage requirements.

Yet another benefit of embodiments of the present invention is that they take advantage of the general benefits of fax communication. One such benefit may be that fax transmissions are easy and quick to initiate, merely requiring the transmitting user to insert a document into a fax machine, enter a destination address (e.g., conventional fax number), and hit a send button, thereby potentially obviating the need to run software on a computer or even have access to a computer. Another benefit of fax transmissions is that faxes may be received and printed immediately and automatically at the receiving end, thereby potentially obviating the need for the receiving user to check an inbox or manually print incoming faxes. Embodiments of the present invention enable both transmitting users and receiving users to retain these benefits of conventional faxes, while supplementing those benefits with the advantages disclosed herein.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The term "IP fax" includes any transmission method (e.g., protocol) that may be used to transmit faxes using Internet Protocol (IP), in whole or in part. For example, the term "IP fax" as used herein encompasses transmission methods which are capable of transmitting faxes without using any conventional fax protocol at any point in the transmission. For example, the term "IP fax" as used herein encompasses transmission methods which are capable of transmitting faxes solely using IP from end-to-end, i.e., at all points from the transmitting user to the receiving user, such as Biscom's HD-IP Fax protocol. In other words, the term "IP fax," as used herein, includes, but is not limited to, Biscom's HD-IP fax.

Certain functions disclosed herein as being performed by the aggregate account server 304 may additionally or alternatively be performed by one or more of the IP fax servers 102a-m. For example, any one or more of the IP fax servers 102a-m may perform the method 600 of FIG. 7 to transmit a high resolution monochrome fax or high resolution color fax according to any of a plurality of transmission methods. The IP fax servers 102a-m may perform such functions only within their own local networks, or across the public Internet.

Furthermore, the functions described herein as being performed by the aggregate account server 304 may be divided in any of a variety of ways between the aggregate account server 304 and one or more of the IP fax servers 102a-m. For example, the aggregate account server 304 and aggregate account database 306 may be addressable over the public Internet and act as a global address registry. For example, the aggregate account database 306 may include mappings between IP fax numbers and conventional fax numbers. When a user of one of the IP fax servers 102a-m transmits the electronic package transmission outbound fax job request 504 to that IP fax server, the IP fax server may query the aggregate account server 304 for information about the destination (e.g., receiving user 124) of the outbound fax job request 504, such as by providing the aggregate account database 306 with information in the outbound fax job request 504 that identifies the receiving user 124 of the request (such as the receiving user 124's conventional fax number), in response to which the aggregate account server 304 may provide the IP fax server with information about the receiving user 124 that is mapped to the request information in the aggregate account database 306, such as the receiving user 124's IP fax number. The IP fax server may then use the information received from the aggregate account server 304 to transmit the high-resolution monochrome or color fax 506, 508 to the receiving user 124. In such an embodiment, the aggregate account server 304 acts as an address registry that is available to the plurality of IP fax servers 102a-m over the public Internet, while the IP fax servers 102a-m perform the function of transmitting high-resolution monochrome or color faxes from one user to another.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method operations of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor of a high-definition (HD) fax system, the method comprising:
   (A) receiving an outbound fax job request, the outbound fax job request including a fax destination identifier and a high-resolution component;
   (B) determining whether the fax destination identifier corresponds with an HD-enabled receiving device;
   (C) if it is determined that the fax destination identifier does not correspond with the HD-enabled receiving device, rendering at least the high-resolution component of the outbound fax job request as a low-resolution fax, and transmitting the low-resolution fax via a public switched telephone network (PSTN);

(D) if it is determined that the fax destination identifier does correspond with the HD-enabled receiving device, determining whether the HD-enabled receiving device is HD color-enabled based on the fax destination identifier; and (E) if it is determined that the HD-enabled receiving device is HD color-enabled, rendering at least the high-resolution component of the outbound fax job request as a high-resolution color fax, and transmitting the high-resolution color fax via a packet-switched network.

2. The method of claim 1, wherein (A) further comprises receiving the outbound fax job request from a HD-enabled transmitting device.

3. The method of claim 1, wherein the low-resolution fax is of a resolution of 200 dots-per-inch (DPI) or lower, and wherein the high-resolution monochrome fax or the high-resolution color fax is of a resolution of 300 DPI or higher.

4. The method of claim 1, wherein the high-resolution component of the outbound fax job request is received as an electronic file attachment associated with an electronic message.

5. The method of claim 4, wherein the electronic file attachment is a Digital Imaging and Communications in Medicine (DICOM) format file.

6. The method of claim 5, wherein (A) further comprises determining that the electronic file attachment is of a high-resolution format.

7. The method of claim 4, wherein the electronic file attachment is a Tagged Image File (TIF) format file.

8. The method of claim 7, wherein (A) further comprises determining that the electronic file attachment is of a high-resolution format.

9. The method of claim 4, wherein the electronic attachment is a Portable Document Format (PDF) file.

10. The method of claim 9, wherein (A) further comprises determining that the electronic file attachment is of a high-resolution format.

11. A high-definition (HD) fax system comprising at least one non-transitory computer-readable medium containing computer program instructions, wherein the computer program instructions are executable by at least one computer processor to perform a method, the method comprising:

(A) receiving an outbound fax job request, the outbound fax job request including a fax destination identifier and a high-resolution component;

(B) determining whether the fax destination identifier corresponds with an HD-enabled receiving device;

(C) if it is determined that the fax destination identifier does not correspond with the HD-enabled receiving device, rendering at least the high-resolution component of the outbound fax job request as a low-resolution fax, and transmitting the low-resolution fax via a public switched telephone network (PSTN);

(D) if it is determined that the fax destination identifier does correspond with the HD-enabled receiving device, determining whether the HD-enabled receiving device is HD color-enabled based on the fax destination identifier; and (E) if it is determined that the HD-enabled receiving device is HD color-enabled, rendering at least the high-resolution component of the outbound fax job request as a high-resolution color fax, and transmitting the high-resolution color fax via a packet-switched network.

12. The HD fax system of claim 11, wherein (A) further comprises receiving the outbound fax job request from a HD-enabled transmitting device.

13. The HD fax system of claim 11, wherein the low-resolution fax is of a resolution of 200 dots-per-inch (DPI) or lower, and wherein the high-resolution monochrome fax or the high-resolution color fax is of a resolution of 300 DPI or higher.

14. The HD fax system of claim 11, wherein the high-resolution component of the outbound fax job request is received as an electronic file attachment associated with an electronic message.

15. The HD fax system of claim 14, wherein the electronic file attachment is a Digital Imaging and Communications in Medicine (DICOM) format file.

16. The HD fax system of claim 15, wherein (A) further comprises determining that the electronic file attachment is of a high-resolution format.

17. The HD fax system of claim 14, wherein the electronic file attachment is a Tagged Image File (TIF) format file.

18. The HD fax system of claim 17, wherein (A) further comprises determining that the electronic file attachment is of a high-resolution format.

19. The HD fax system of claim 14, wherein the electronic attachment is a Portable Document Format (PDF) file.

20. The HD fax system of claim 19, wherein (A) further comprises determining that the electronic file attachment is of a high-resolution format.

* * * * *